US012355220B2

(12) United States Patent
Eisele et al.

(10) Patent No.: US 12,355,220 B2
(45) Date of Patent: Jul. 8, 2025

(54) OUTER SHEATH/BUFFER TUBE CABLE SLITTER

(71) Applicant: Hubbell Power Systems, Inc., Shelton, CT (US)

(72) Inventors: Will Eisele, Cromwell, CT (US); Brian Bourgoin, Cromwell, CT (US)

(73) Assignee: Hubbell Power Systems, INC., Shelton, CT (US)

( * ) Notice: Subject to any disclaimer, the term of this patent is extended or adjusted under 35 U.S.C. 154(b) by 230 days.

(21) Appl. No.: 17/149,363

(22) Filed: Jan. 14, 2021

(65) Prior Publication Data
US 2021/0237295 A1    Aug. 5, 2021

Related U.S. Application Data

(60) Provisional application No. 62/960,928, filed on Jan. 14, 2020.

(51) Int. Cl.
*H02G 1/12*     (2006.01)
*B26D 3/00*    (2006.01)
*G02B 6/44*    (2006.01)

(52) U.S. Cl.
CPC ............. *H02G 1/12* (2013.01); *B26D 3/001* (2013.01); *G02B 6/443* (2013.01)

(58) Field of Classification Search
CPC ...... H02G 1/1214; H02G 1/12; H02G 1/1202; H02G 1/1204; H02G 1/1207; H02G 1/1209; H02G 1/1212; H02G 1/1217; H02G 1/1219; H02G 1/1221; H02G 1/1224; H02G 1/1229; H02G 1/1234; H02G 1/1236; B26D 3/001; B26D 3/08; B26D 3/16; B26D 3/162; B26D 3/166; B26D 3/169
USPC ................... 30/90.1–90.9, 91.1, 91.2; 81/9.4
See application file for complete search history.

(56) References Cited

U.S. PATENT DOCUMENTS

| 2,419,511 | A |   | 4/1947  | Vaughan, Jr. |
| 5,140,751 | A |   | 8/1992  | Faust |
| 5,829,322 | A | * | 11/1998 | Chen ............... H02G 1/1224 30/91.2 |
| 7,103,968 | B2 |  | 9/2006  | Karrasch |
| 7,735,228 | B2 |  | 6/2010  | Schmode et al. |

(Continued)

FOREIGN PATENT DOCUMENTS

| CN | 207732365    | 8/2018 |
| DE | 9309098 U1   | 8/1993 |

(Continued)

*Primary Examiner* — Phong H Nguyen
(74) *Attorney, Agent, or Firm* — Ruggiero McAllister & McMahon LLC

(57) ABSTRACT

A cable sheath slitting tool comprising first and second opposing tool frame members wherein at least a portion of the tool frame members are movable toward and away from one another, a pair of opposing blades securable on the respective tool frame member, the blades having a blade tip extending toward each other and are movable toward and away from each other and a first and second tray securable on the first and second tool frame member, respectively, each of the first and second trays including a tray cavity wherein a cable may be secured in the cavity with the blade positioned to slit the cable when the tool is in a closed position with the tool frame member portions toward one another.

19 Claims, 15 Drawing Sheets

(56) References Cited

U.S. PATENT DOCUMENTS

| | | | | |
|---|---|---|---|---|
| 2009/0019706 A1* | 1/2009 | Werner | ............... | B26B 19/3813 30/233.5 |
| 2009/0188349 A1* | 7/2009 | Hanning | .............. | H02G 1/1241 81/9.43 |
| 2013/0111763 A1* | 5/2013 | Steiner | ................. | H02G 1/1224 30/91.2 |
| 2016/0006225 A1* | 1/2016 | Watkins | ............... | H02G 1/1241 30/91.2 |
| 2016/0016302 A1* | 1/2016 | Zinser | .................. | H02G 1/1236 81/9.4 |
| 2019/0058313 A1 | 2/2019 | Murg et al. | | |

FOREIGN PATENT DOCUMENTS

| | | |
|---|---|---|
| EP | 0184897 A1 | 6/1986 |
| JP | S59195204 A | 11/1984 |
| JP | H11150824 | 6/1996 |

* cited by examiner

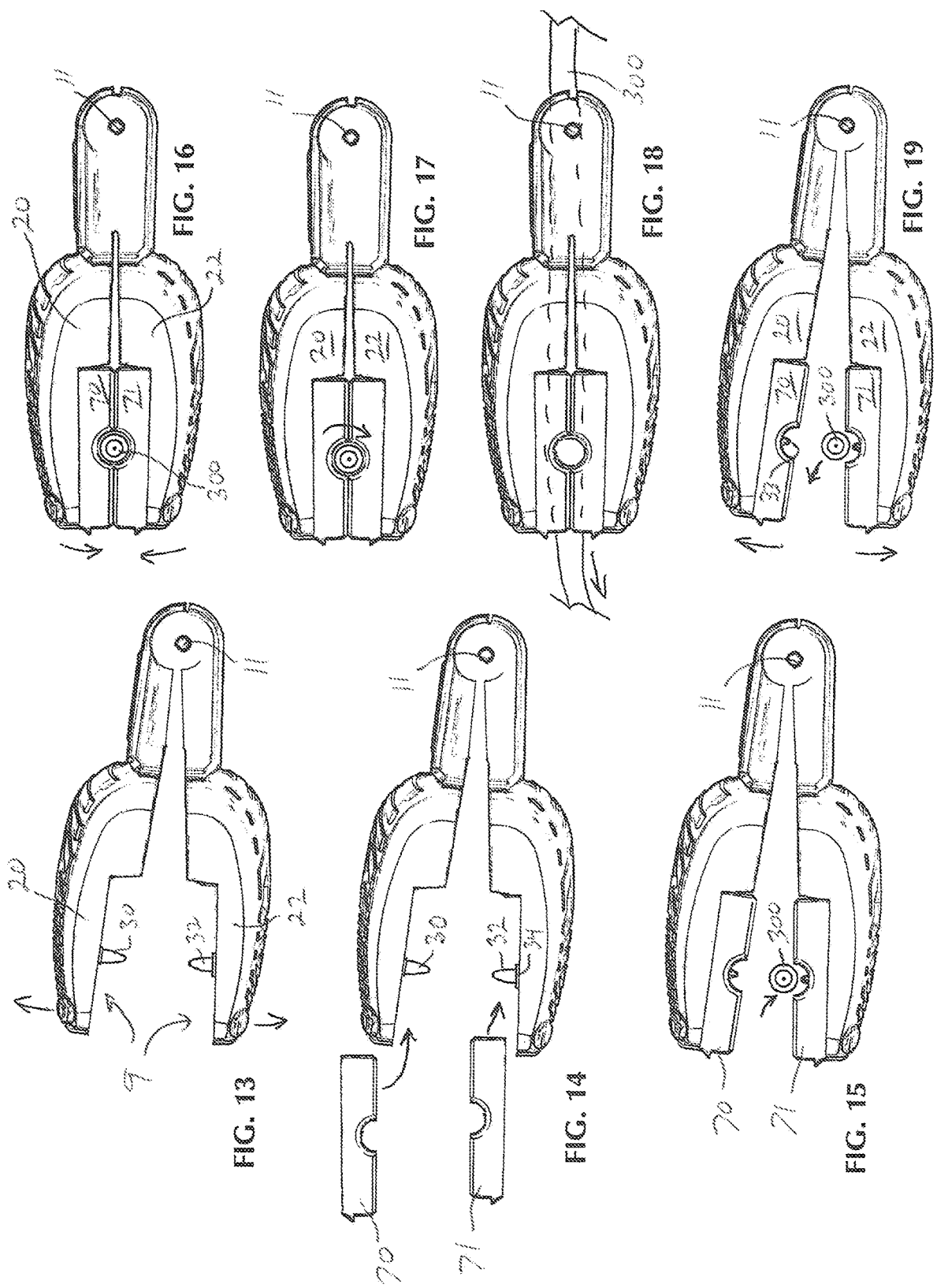

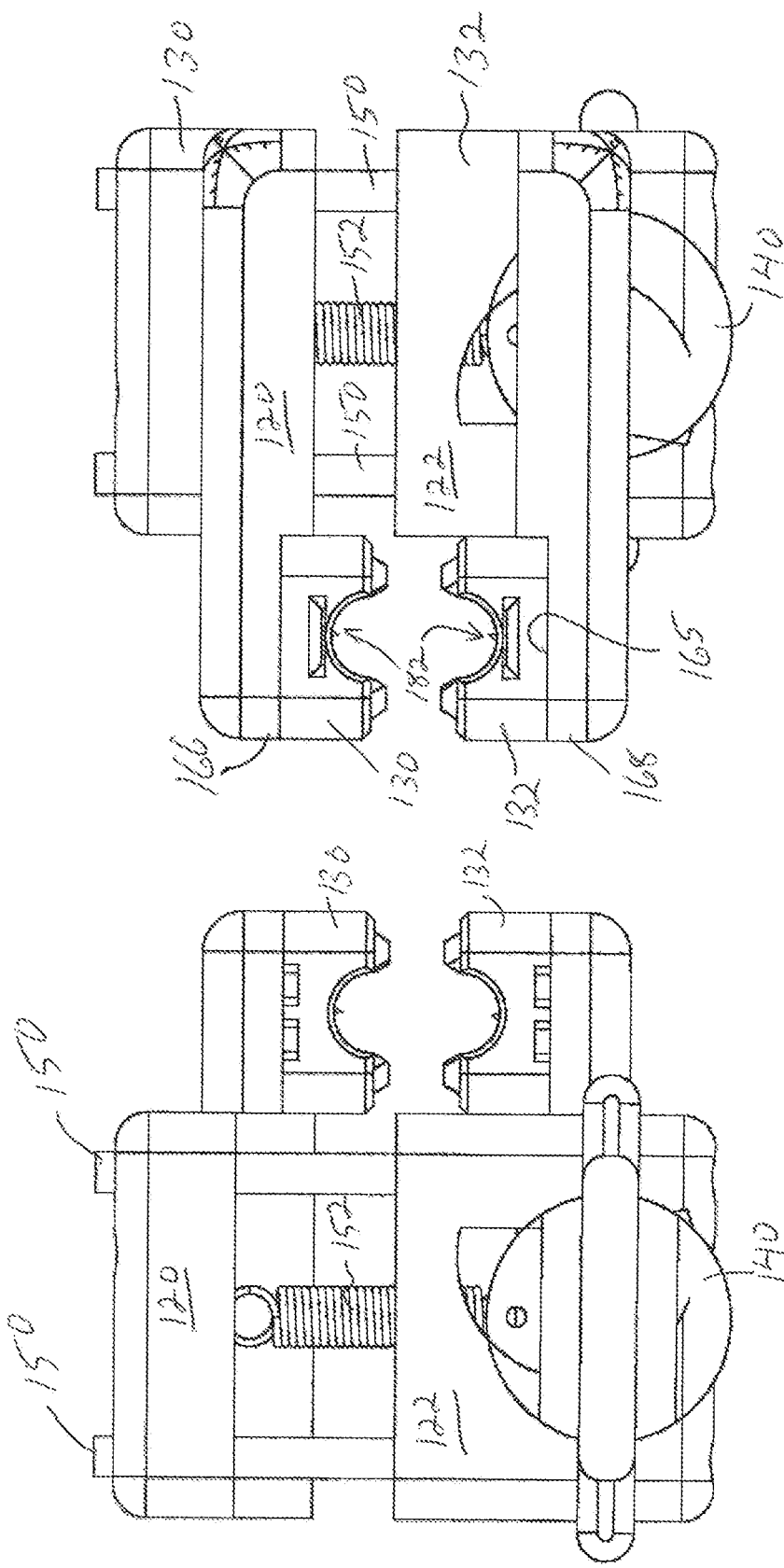

OUTER SHEATH/BUFFER TUBE CABLE SLITTER

BACKGROUND OF THE INVENTION

1. Field of the Invention

The present invention relates to a cable sheath slitter for accessing transmission strands in a cable.

2. Description of Related Art

Currently available adjustable blade slitters have numerous moving parts and require the user to adjust depth of the blade corresponding to each cable size. Some of these tools have a single V-block to position and orient the cable parallel or rotated 90 degrees with the blade to allow for a longitudinal or ring cut. Some tools have a rotating blade so a fixed V-block can be used for both cutting directions. Since the tools use a generic V-block, the end user must adjust the both the upper and lower blade depth. The V-blocks allow for varying cable sizes, but do not have fixed height stops. As a result, the end user needs to be careful not to squeeze the tool closed too tightly. If they squeeze too tightly, the cable will be pinched between the opposing V-blocks and this will add friction when making a cut. Although a blade adjustment provides versatility, the end user needs to be very precise to set the depth correctly. It is also critical that the top and bottom blades are adjusted equally. This is very difficult if the end user is attempting a midspan cut and does not know the ideal depth. Even while setting up for end stripping, there is room for error. Too shallow setting will not cut and too deep of a setting will damage the internal fiber tubes. This tool is not ideal for an end user looking to have a repeatable and foolproof tool for their specific cable application range and requires a higher level of skill to use the tool.

Another group of tools currently available are fixed blade slitters. These tools have different channels sized for the outer diameter of the cable. Aligned in these channels are blades with fixed depths related to the cable wall thickness of the application. Each channel requires a pair of blades for a top and bottom cut. Some tools have longitudinal and ring cut channels and the blades are installed rotated 90 degrees to achieve the different cutting action. These tools are bulky and require many blades. The blade depth can be accurately set for each channel, but the number of channels becomes limited due to size and cost restrictions for the entire tool.

The fixed blade tools can be divided into locking tools and tools that don't lock. Locking tools require the end user to use a clasp or latch to close the tool around the tube. The flaw in this style tool is that the tool will be forced open as it is being used. Since the latch will always need some amount of clearance to work properly, there is always some finite amount of loosening. This causes the overall diameter and blade setting to lose accuracy. This will result in longitudinal cuts that do not pierce the jacket fully. These tools can be difficult to load the cable multiple times and require the latch to be opened and closed multiple times, especially if the tool has ring and longitudinal cut channels. In addition, the end user needs to align the cable with the correct channels, which can be difficult since the channels may be very close in size and difficult to verify the cable is aligned and installed in the correct channel.

SUMMARY OF THE INVENTION

Bearing in mind the problems and deficiencies of the prior art, it is therefore an object of the present invention to provide a cable sheath slitting tool which does not require adjustment for specific sized cables.

It is another object of the present invention to provide a cable sheath slitting tool which has multiple tool trays for slitting the sheath of various sized cables.

Still other objects and advantages of the invention will in part be obvious and will in part be apparent from the specification.

Fiber optic cables come in many different configurations and outer jacket sizes. There is a need to be able to access the cable by making longitudinal and ring cuts through the jacket to gain access to the interior fibers. Conventional tools used for midspan and end strip applications can be difficult to use and inaccurate. Some have blade depth adjustments which can be difficult to set correctly and repeatably. Other tools have a series of channels with integral blades set to specific depths. These tools rely on the opposite side blades to pierce and cut the jacket wall 180 degrees opposed. Some tools only have the capability to do longitudinal or ring cutting. Other tools offer both options but require a different set of blades and channels for each cutting option. This invention is based on a fiber optic cable tool, but the application could reach to other forms of cable or duct.

The slitting tool according to the present invention uses a pivoting chassis with a fixed pair of blades in the upper and lower housings. A series of replaceable trays can be installed which are specific to the cable diameter and jacket thickness. These trays provide the longitudinal and rotational guide channels and well as set the blade protrusion for accurate depth of cut. The tool will work for midspan and end strip application.

The slitting tool offers a new tool platform to perform repeatable and precise ring and longitudinal cuts in the outer sheath of various cables without blade adjustment.

The above and other objects, which will be apparent to those skilled in the art, are achieved in the present invention which is directed to a cable sheath slitting tool comprising a first and second opposing tool frame members wherein at least a portion of the tool frame members are movable toward and away from one another. The tool includes a pair of opposing blades securable on the respective tool frame member, the blades having a blade tip extending toward each other and are movable toward and away from each other and a first and second tray securable on the first and second tool frame member, respectively, each of the first and second trays including a tray cavity wherein a cable may be secured in the cavity with the blade positioned to slit the cable when the tool is in a closed position with the tool frame member portions toward one another. The tool may include a pivot pin wherein one end of each frame member is rotatable about the pivot pin and the opposite end of each frame member is movable toward and away from the opposite frame member. An inner surface of each frame member may be positioned at an angle from one another when the tool is in the closed position and wherein first and second tray include a bottom surface positioned against the tool frame member depression and a top surface at an angle to the bottom surface for allowing the first and second tray top surfaces to meet parallel to one another when the tool is in the closed position. The first and second trays may be removable and replaceable with third and fourth trays having different sized ring cut and longitudinal cut concave surface diameters than the first and second trays, the first and second trays for a first cable having a first diameter and the third and fourth trays for a second cable having a second diameter different from the first diameter. The first and second trays may be removable and replaceable with third and fourth trays having a different tray height than the first and second trays, the first and second trays for a first cable having a first sheath thickness and the third and fourth trays for a second cable having a second sheath thickness different from the first diameter. A first angle between a top surface of the first and second tray relative to a bottom surface of the first and second tray may be different from a second angle between a top surface of the third and fourth tray relative to a bottom surface of the second and third tray. The tool may include first and second concave ring cut surfaces spaced from one another across the tray cavity for guiding the cable when slitting in a circular direction around the diameter of the cable and first and second longitudinal cut surfaces spaced from one another in a direction perpendicular the ring cut surface spacing for guiding the cable when slitting along the length of the cable. The tool may include a first and second magnet secured to the first and second frame members respectively and a first and second metal element secured to the first and second tray respectively wherein the first magnet removably secures the first tray to the first frame member and the second magnet removably secures the second tray to the second tray member. The tool may include a first and second magnet secured to the first and tray respectively and a first and second metal element secured to the first and second frame member respectively wherein the first magnet removably secures the first tray to the first frame member and the second magnet removably secures the second tray to the second tray member. The tool may include a first and second tool chassis end wherein the first and second trays are securable to the first end of the tool chassis and the second end of the tool chassis is offset from a tool centerline axis so that the cable, when inserted in the tool for a longitudinal cut may extend through the entire tool without obstruction. The tool may include a rotatable latch knob for locking the tool in the closed position. The latch knob may be for securing the tool in the closed position for storage. The latch knob may be rotatably secured to the first or second tool frame member on an end portion of the tool opposite the tool end securing the first and second trays, the latch knob having a circular edge including a flat surface on the circular edge, the flat surface engagable with a portion of the other of the first or second tool frame member. The tool may include a rotatable latch knob for locking the tool in the closed position wherein the latch knob is variably adjustable for securing the tool in a closed position regardless of the tray depth. The blades may be removably secured to the first and second frame members.

Another aspect of the invention is directed to a method for using a slitting tool comprising providing first and second opposing tool frame members wherein at least a portion of the tool frame members are movable toward and away from one another, a pair of opposing blades securable on the respective tool frame member, the blades having a blade tip extending toward each other and are movable toward and away from each other and a first and second tray securable on the first and second tool frame member, respectively, each of the first and second trays including a tray cavity wherein a cable may be secured in the cavity with the blade positioned to slit the cable when the tool is in a closed position with the tool frame member portions toward one another. The method includes providing a cable, ensuring the first and second tool frame members are in an open position, placing a tube or cable having an outer jacket in one of the first or second trays and moving the first and second tool frame members to the closed position whereby the blades extending inward from each of the trays pierces the outer jacket of the cable. The method includes moving the cable until the desired cut in made in the cable sheath, moving the first and second tool frame members to the open position and removing the slit cable from the tray. The first and second trays may be replaceable with third and fourth trays having a different tray depth and different concave surface diameters than the first and second trays and the method may include selecting a first and second tray for insertion into the first and second tool frame members, the tray selection based on the diameter of the cable and the thickness of the outer jacket of the cable and the method includes selecting the desired pair of trays and securing the selected trays to the first and second frame member after the step of ensuring the first and second tool frame members are in an open position. The first and second trays may include first and second concave ring cut surfaces spaced from one another across the tray cavity for guiding the cable when slitting in a circular direction around the diameter of the cable and first and second longitudinal cut surfaces spaced from one another in a direction perpendicular the ring cut surface spacing for guiding the cable when slitting along the length of the cable, where the first and second ring cut surfaces secure the cable in a direction perpendicular to the first and second longitudinal cut surfaces. The step of placing a cable having an outer jacket in one of the first or second trays may include placing the cable having an outer jacket in the first and second ring cut surfaces of one of the first or second and the step of moving the cable until desired cut in made in the cable sheath includes rotating the cable until a ring cut is made in the cable. The step of placing a cable having an outer jacket in one of the first or second trays may include placing the cable having an outer jacket in the first and second longitudinal cut surfaces of one of the first or second trays and the step of moving the cable until the desired cut in made in the cable sheath includes moving the cable in a longitudinal direction.

Another aspect of the present invention is directed to a cable sheath slitting tool comprising a first and second opposing tool frame members wherein at least a portion of the tool frame members are movable toward and away from one another. The tool includes a pair of opposing blades securable on the respective tool frame member, the blades having a blade tip extending toward each other and are movable toward and away from each other and a first and second tray securable on the first and second tool frame member, respectively, each of the first and second trays including a tray cavity wherein a cable may be secured in the cavity with the blade positioned to slit the cable when the tool is in a closed position with the tool frame member portions toward one another. The tool may include a pair of parallel rods extending from the second tool frame member toward the first frame member and a pair of parallel openings extending through the second frame member wherein the parallel rods extend through the parallel openings allowing the first frame member to slide toward and away from the second frame member with the first and second tray maintaining the same orientation with respect to one another. The tool may include a primary knob rotatably secured to the second frame member for moving the first frame member toward and away from the second frame member. The tool may include a locking member for locking the tool in the closed position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 13 shows a first step for a method for using the slitting tool according to the present invention.

FIG. 14 shows a second step for a method for using the slitting tool according to the present invention.

FIG. 15 shows a third step for a method for using the slitting tool according to the present invention.

FIG. 16 shows a fourth step for a method for using the slitting tool according to the present invention.

FIG. 17 shows a fifth step for a method for using the slitting tool according to the present invention.

FIG. 18 shows a sixth step for a method for using the slitting tool according to the present invention.

FIG. 19 shows a seventh step for a method for using the slitting tool according to the present invention.

FIG. 27 shows a right side elevational view of the slitting tool shown in FIG. 25.

FIG. 28 shows a left side elevational view of the slitting tool shown in FIG. 25.

DESCRIPTION OF THE EMBODIMENT(S)

In describing the embodiment of the present invention, reference will be made herein to FIGS. 1-39 of the drawings in which like numerals refer to like features of the invention.

Figure 1A:
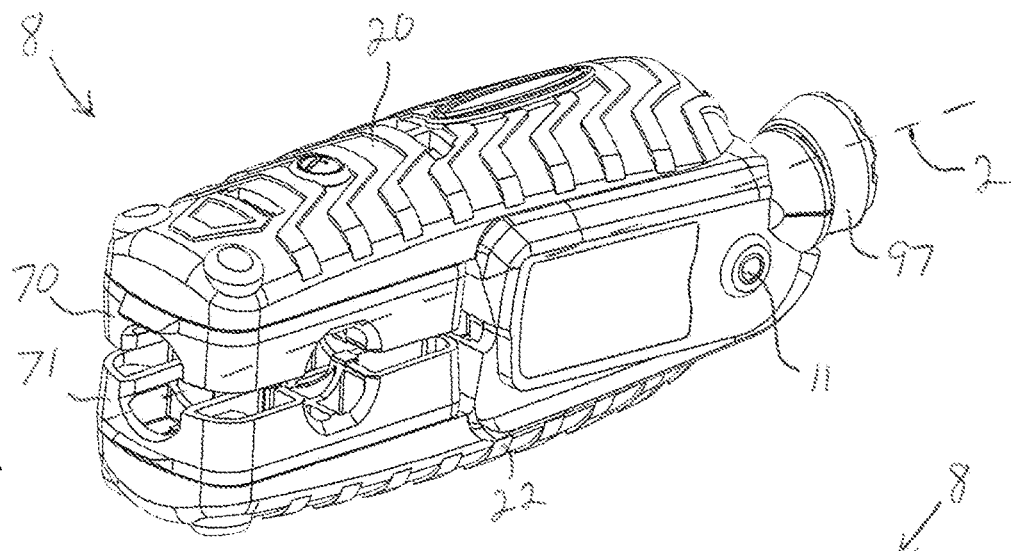
FIG. 1A is a front right top perspective view of a cable slitting tool according to the present invention.
Figure 1B:
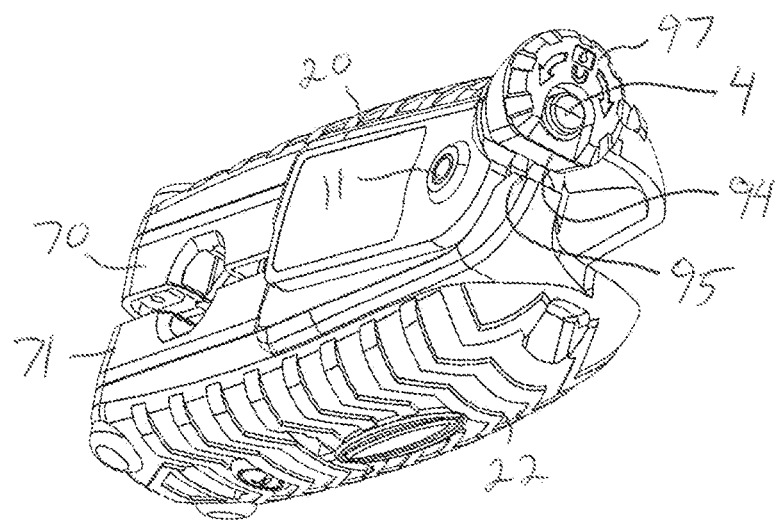
FIG. 1B is a rear right bottom perspective view of the cable slitting tool shown in FIG. 1A.
Figure 1C:
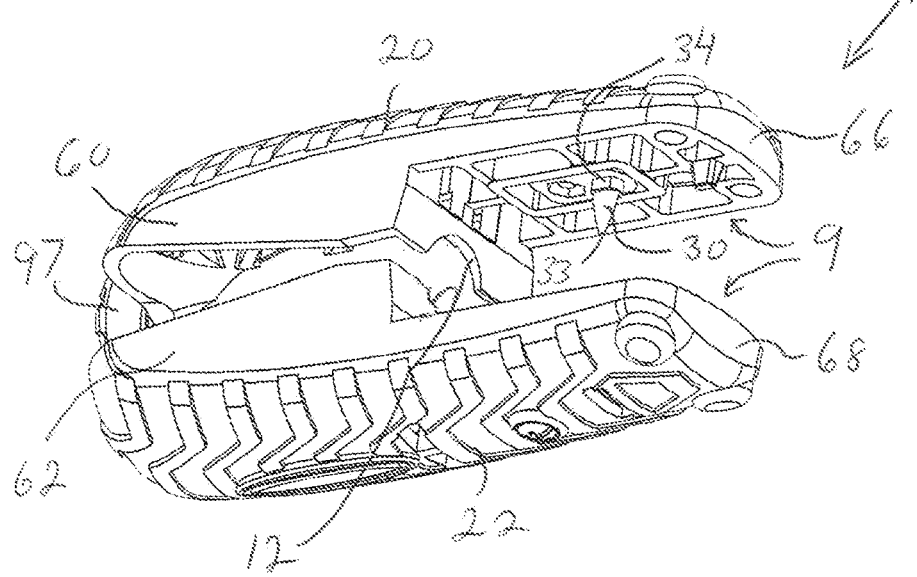
FIG. 1C is a front left bottom perspective view of the cable slitting tool frame.
Figure 2:
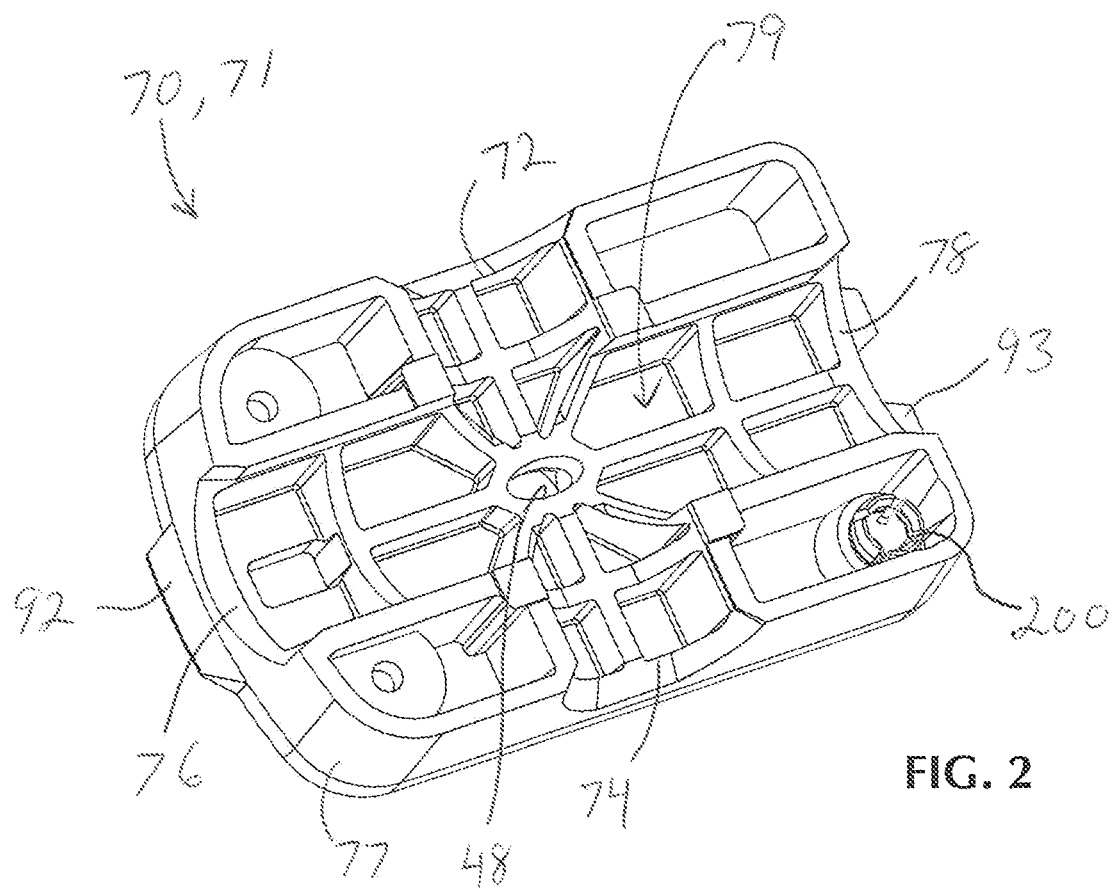
FIG. 2 is a perspective view of the cable tray top surface securable to the cable slitting tool frame shown in FIG. 1C.
Figure 3:
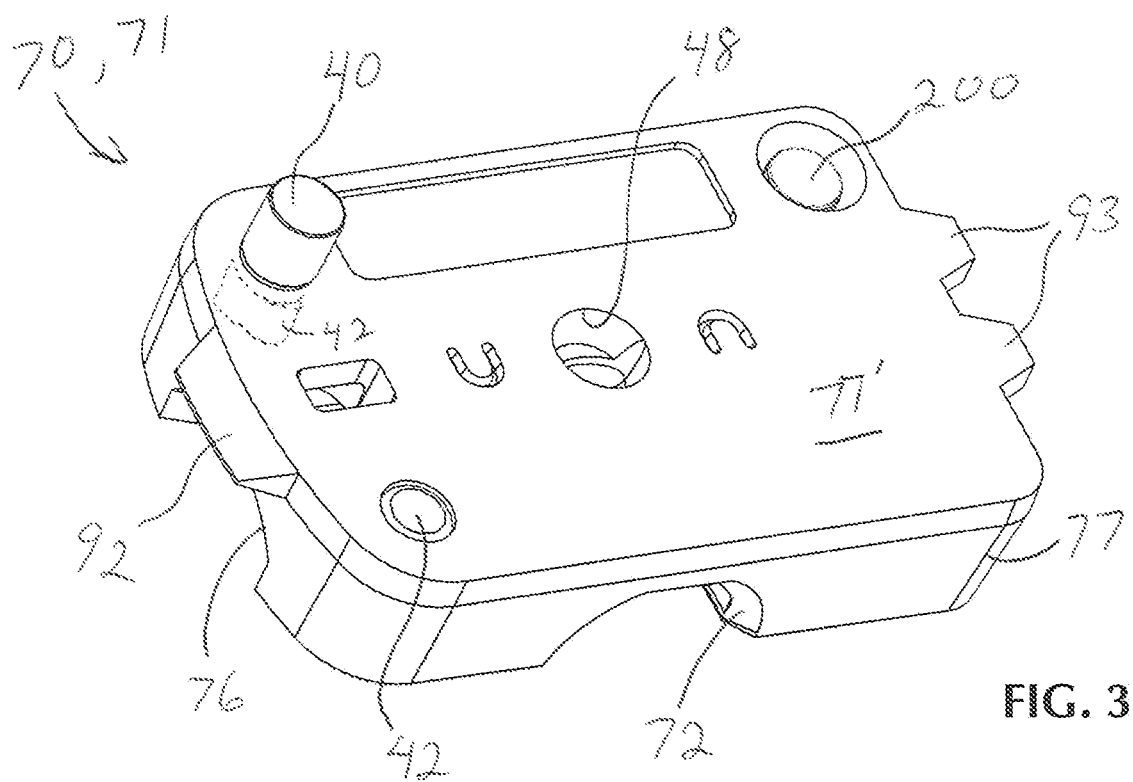
FIG. 3 is a perspective view of the cable tray bottom surface securable to the cable slitting tool frame shown in FIG. 1C.
Figure 4A:
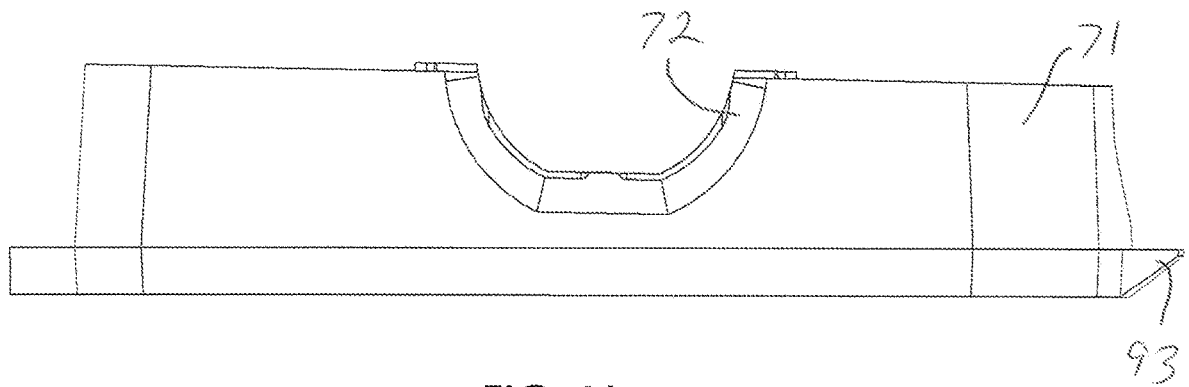
FIG. 4A is a side elevational view of the lower cable tray.
Figure 4B:
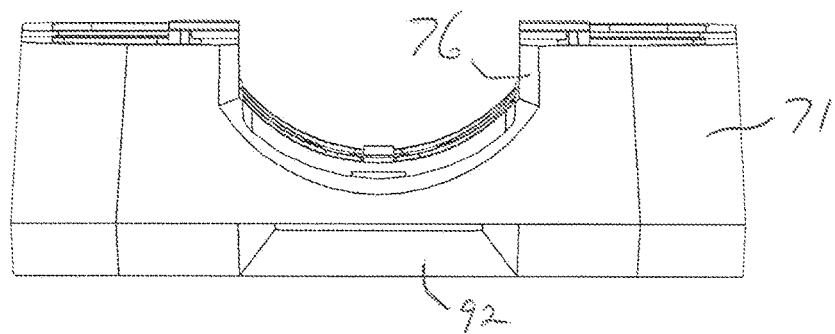
FIG. 4B is a front elevational view of the lower cable tray.

A tube or cable jacket slitting tool 8 is shown in FIGS. 1A and 1B of the drawings. FIG. 1C shows the chassis 10 of the slitting tool 8. The slitting tool 8 includes a pair of removable and interchangeable trays 70, 71 shown in FIGS. 2, 3, 4A and 4B. The slitting tool 8 slits cable jackets on cables having various diameters and various sheathing or jacket thicknesses. The slitting tool includes a chassis 10 having first and second opposing tool frame members 20, 22. Each tool frame member 20, 22 includes a depression 9 (see FIG. 1C) along a first end 66, 68 of each tool frame member 20, 22 for insertion of the tray 70, 71. The chassis 10 includes a pair of opposing frame concave surfaces 12 for positioning the cable with respect to the chassis 10 when the tool is in the closed position. The chassis 10 includes a pair of opposing blades 30, 32 (blade 32 shown in FIG. 9) having a blade tip 33, each blade 30, 32 secured to the respective tool frame member 20, 22 and a blade support 34 for retaining the blades 30, 32 on the respective tool frame member 20, 22. The chassis 10 includes a pivot pin 11 rotatably securing a second end 60, 62 of the first and second tool frame members 20, 22, the second end 60, 62 opposite the first end 66, 68 of each tool frame member 20, 22, whereby the first end 66, 68 of the first and second tool frame members may move toward and away from each other. The pivot pin 11 is offset from the tool centerline or axis 2 so that the cable, when inserted in the tool for a longitudinal cut may extend through the entire tool without obstruction.

The slitting tool 8 first and second trays 70, 71 are securable in the depression 9 of the first and second tool frame member 20, 22, respectively. Each of the first and second trays 70, 71 (FIGS. 2, 3, 4A and 4B) includes a tray base 77 having a tray cavity 79 and a lip 92 extending outwardly from the tray base 77 for easy removal of the tray

70, 71. The tray 70, 71 includes first and second concave ring cut groove surface 72, 74 spaced from one another across the tray cavity 79 for guiding the cable when slitting in a circular direction around the diameter of the cable. The tray 70, 71 includes first and second longitudinal cut groove surface 76, 78 spaced from one another in a direction perpendicular to the ring cut surface 72, 74 for guiding the cable when slitting along the length of the cable. Each tray 70, 71 includes a blade opening 48 for allowing the blade to extend from the tray base bottom surface 77', through the tray base 77 and into the tray cavity 79. The tray 70, 71 includes at least one metal member 42 which may be a metal dowel or rod that secures the tray 70, 71 in the corresponding depression by mating with a magnet 40 secured in the corresponding tool frame member 20, 22. Although the corresponding tool frame member 20, 22 is not shown in FIG. 3, the magnet 40 is shown in the relative position when the tray is secured in the corresponding tool frame member 20, 22. Tray tabs 93 aid in aligning the tool tray 70, 71 when being inserted in the depression 9. A color-coded insert 200 may be used to identify trays for specific cables.

Figure 5:
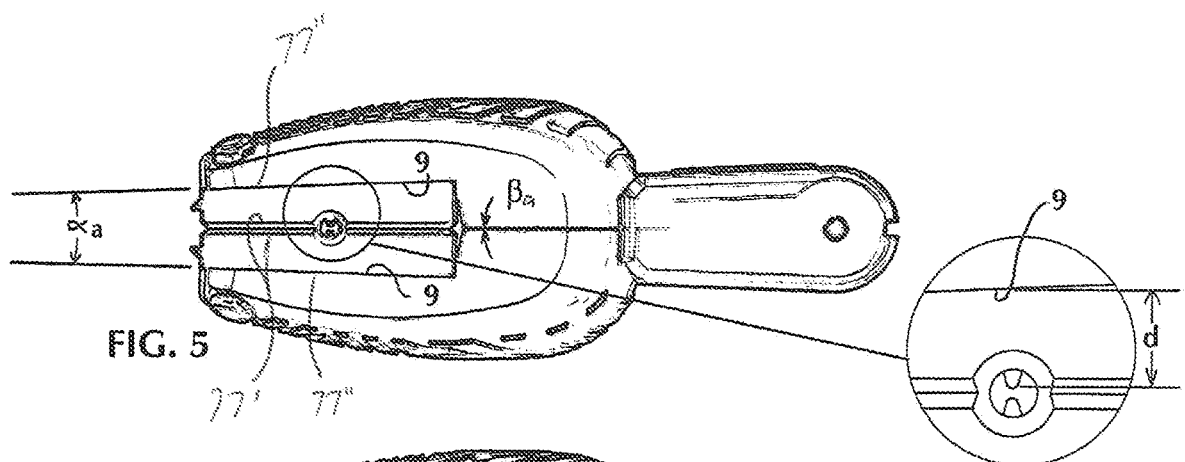
FIGS. 5-8 are side elevational views of the slitting tool having various trays options according to the present invention.
Figure 6:
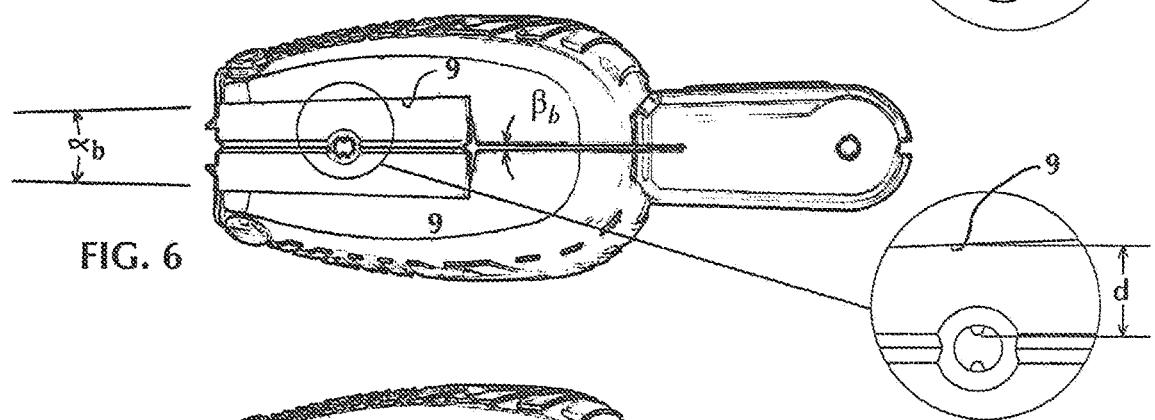
Figure 7:
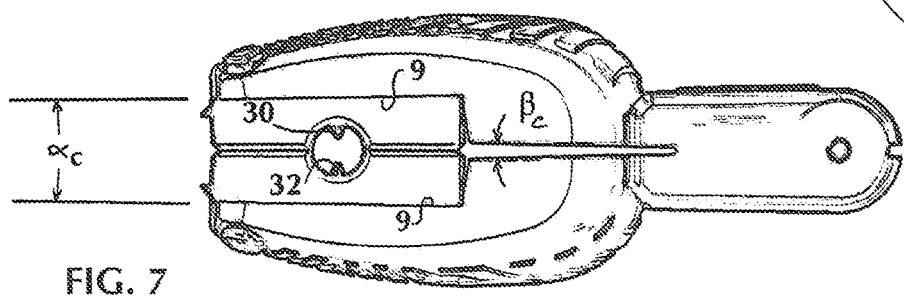
Figure 8:
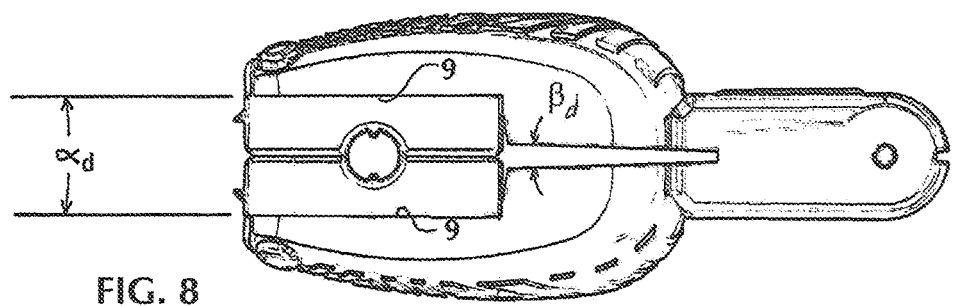

FIGS. 5-8 show tray variations for accommodating cables with different size diameters and sheath thicknesses. The first and second tray 70, 71 may include a bottom surface 77' positioned against the tool frame member depression 9 and a top surface 77" opposite the bottom surface' on a plane at a desired angle to the plane bottom surface 71, either parallel (0°) or at an acute angle, for accommodating tubes or cables of different diameters and allowing the first and second tray top surfaces 71" to meet parallel to one another when the tool 8 is in the closed position. The tray thickness separates the ends of the tool frame members 20, 22, and consequently sets the spacing of the blades extending from the respective frame members when the tool is in the closed position. The first and second trays 70, 71 are removable and replaceable with different sets of trays having a different tray depth and/or different sized ring cut and longitudinal cut concave surface diameters to accommodate different specific cable sizes. For example, first and second trays 70 may be configured to accommodate a larger cable size diameter, as shown in FIG. 8, and the planes of the bottom surface 71' and top surface 71" may be parallel. For successively smaller cable diameters, as shown in FIGS. 7, 6 and 5, the angles between the planes of the bottom surface 71' and top surface 71" will be successively larger acute angles. The successively larger acute angles are also shown in angle β between the surfaces of tool frame member 20, 22 adjacent the trays shown in FIGS. 8, 7, 6 and 5. The tray depth and plane angle between the bottom and top tray surface for each set of first and second trays is selected so that the blade extends to the desired depth of cut into the sheath for the cable diameter of that set of trays.

Comparing the trays in FIGS. 5-8, the tip of the blade 30, 32 is positioned at the same distance d from the where the blade is attached to the frame member depression 9, regardless of which trays are used, since the blade may be mounted directly to the frame member 20, 22. The blade is preferably mounted to the corresponding frame member with a blade support. The picture inserts shown in FIGS. 5 and 6 show the distance d is the same in both with the tray thickness determining the depth of the blade cut. Although the tray in FIG. 5 would support the same diameter cable as the tray in FIG. 6, the tray thickness at the location where the blade is mounted is different. The tray depth (thickness from the bottom surface to the top surface) determines the exposure distance of the blade and the exposure distance is determined by the thickness of the cable 300 sheath to be slit. The tray in FIG. 6 has a thickness greater than the tray thickness of FIG. 5, decreasing the angle α and increasing the angle β.

Figure 10:
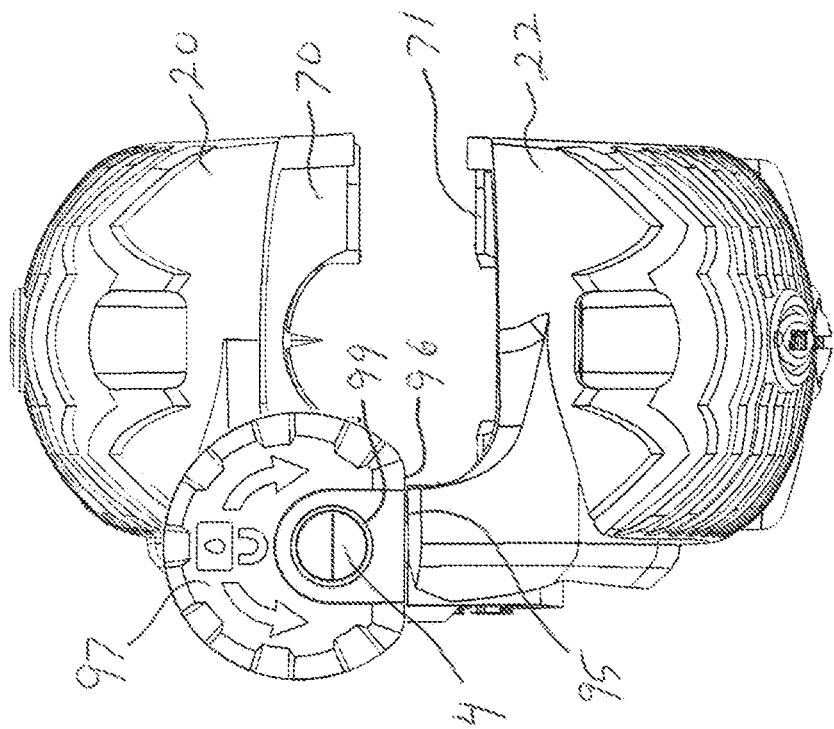
FIG. 10 shows a rear view of the slitting tool with the locking knob and tool in an open position.
Figure 9:
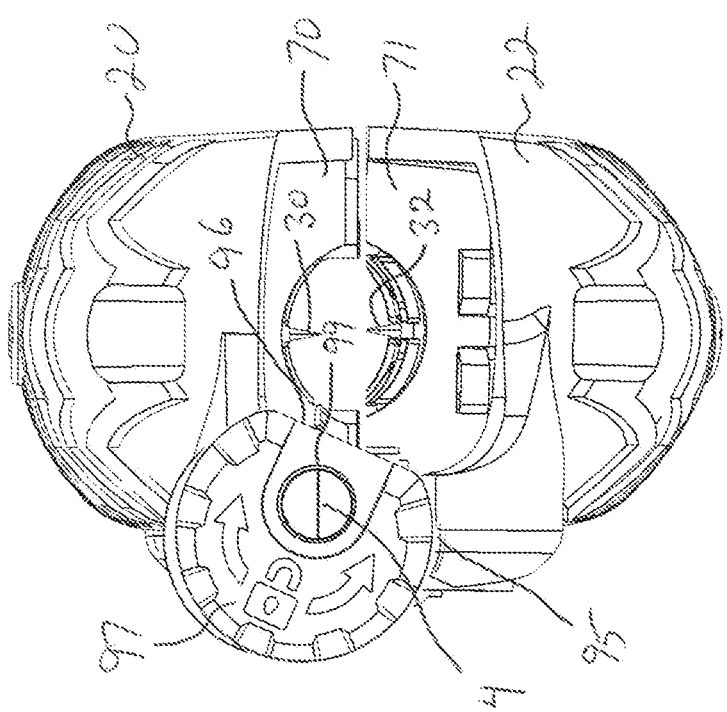
FIG. 9 shows a rear view of the slitting tool with the locking knob and tool in a closed and locked position.
Figure 12:
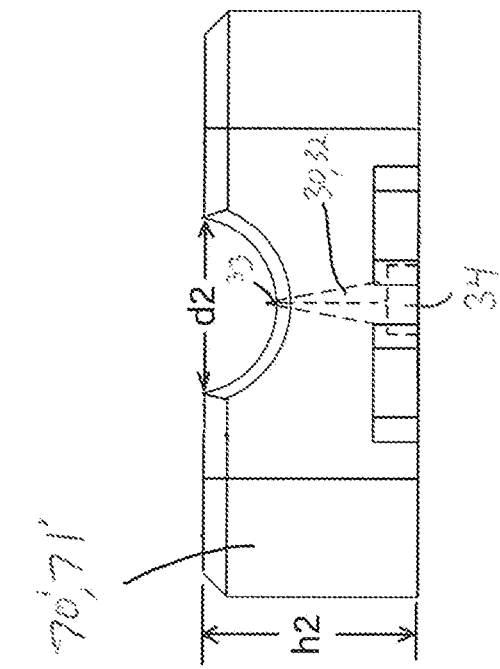
FIG. 12 shows a tray having a groove diameter and tray depth for a cable different than the cable for the tray of FIG. 11.

As shown in the closed tool 8 of FIG. 9 and the opened tool 8 of FIG. 10, the slitting tool 8 includes a locking knob 97 having a locking knob opening 99 rotatably engaged with a second frame member post 4 extending rearward from the second frame member 22. The locking knob opening 99 is offset from the center of the locking knob 97 so that the locking knob 97 rotates eccentrically about the post 4. The locking knob 97 includes a flat portion 94 for engaging a locking surface 95 on the first frame member 20 wherein the locking knob 97 locks the tool in the closed position. The locking position of the locking knob 97 is dependent on the depth of the trays 70, 71 secured to the first and second frame member 20, 22, the locking position being continuously variable for accommodating various tray depths.

Figure 11:
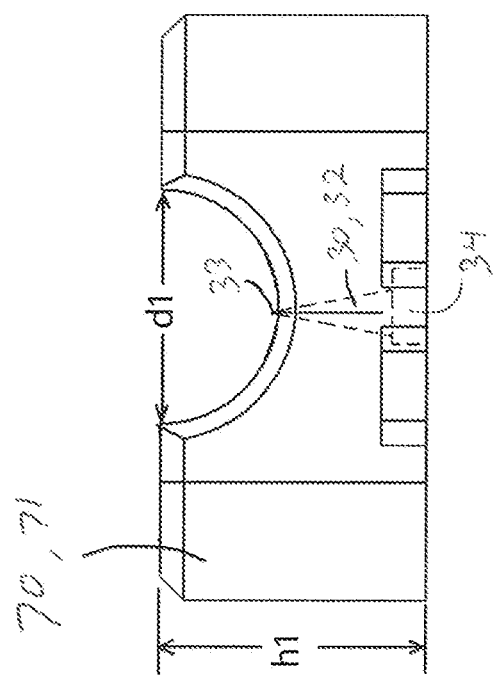
FIG. 11 shows a tray having a groove diameter and tray depth for a specific cable.

The tray shown in FIG. 11 (same as tray in FIGS. 1A and 1B) has a depth h1 which allows the blade tip 33 slit a first cable 300 having a diameter d1 and a sheath of a specific thickness. The tray shown in FIG. 12 has a depth h2 larger than h1 since a second cable 400 having a larger diameter d1 may still have the sheath having the same thickness as the sheath of the first cable 300 and require the blade tip 33 to extend into the tray grooves the same distance. The depth of the tray compensates for the larger diameter groove.

FIGS. 13-19 show a method for using the slitting tool 8. The method includes ensuring the first and second tool frame members 20, 22 are in an open position. The user then selects a first and second tray 70, 71 for insertion into the first and second tool frame members 20, 22, the tray selection based on the diameter of the cable 300 and the thickness of the outer jacket of the cable 300. The user inserts the cable 300 into the ring cut groove or the longitudinal groove depending if a circular slit is to be made or a horizontal cut along the length of the cable 300. A user then moves the first and second tool frame members 20, 21 to the closed position whereby the blade tip 33 on blades 30, 32 extending inward from each of the trays 70, 71 pierces the outer jacket of the cable 300. The user then moves the cable 300 until the desired cut in made in the cable 300 sheath, moves the first and second tool frame members 20, 22 to the open position and removes the slit cable 300 from the trays 70, 71. The first and second trays 70, 71 are replaceable with third and fourth trays 70', 71' having a different tray depth and different concave surface diameters than the first and second trays 70, 71. Although the drawings of FIGS. 15-17 and 19 show the cable 300 positioned for a ring cut, the placement of the cable 300 in the longitudinal cut surfaces as in FIG. 18, the method of these figures may also apply to the longitudinal cut with the placement of the cable 300 being across the tool rather than in the direction of the tool length.

Figure 20:
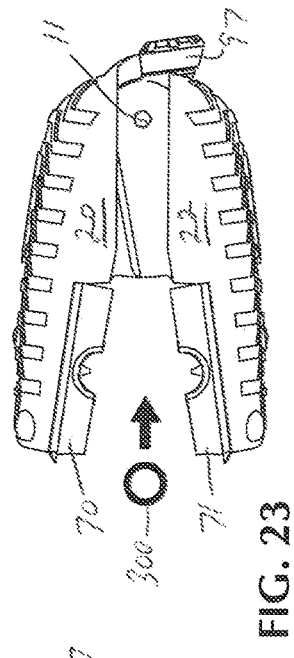
FIG. 20 shows the step for inserting a tray into the depression of the slitting tool according to the present invention.
Figure 21:
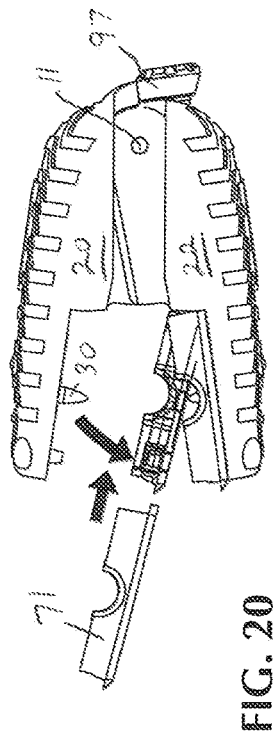
FIG. 21 shows the step for removing a tray into the depression of the slitting tool according to the present invention.
Figure 23:
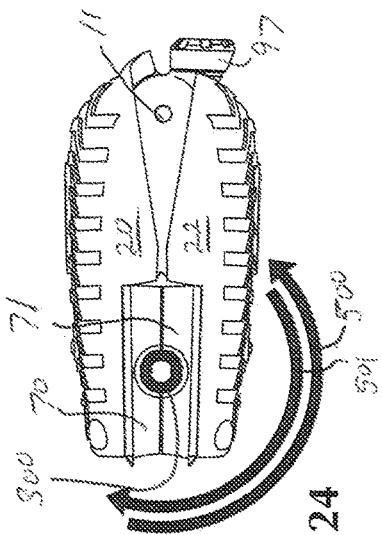
FIG. 23 shows a cable being inserted into the slitting tool for a ring cut.
Figure 24:
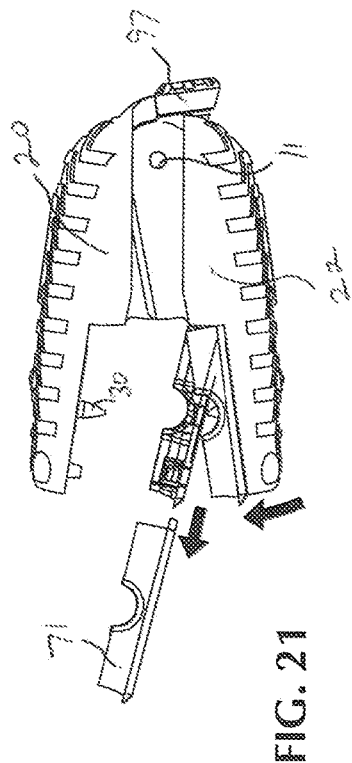
FIG. 24 shows the slitting tool being rotated about a cable for making a ring cut in the cable.
Figure 22A:
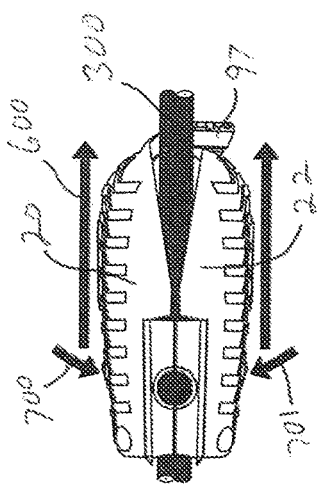
FIG. 22A shows the locking knob being engaged for locking the slitting tool in the closed position.
Figure 22B:
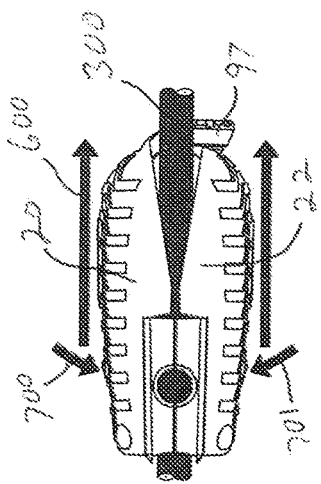
FIG. 22B shows a step for inserting a cable for a longitudinal cut in the slitting tool.
Figure 22C:
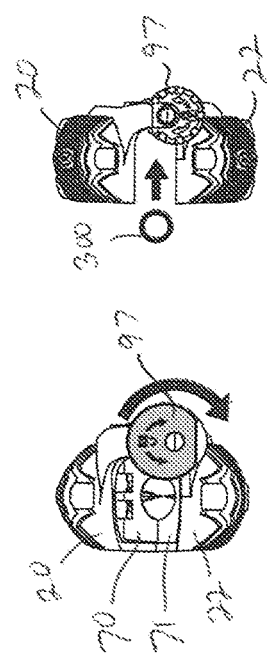
FIG. 22C shows the steps for closing the slitting tool and slitting the cable along the length of the cable.

In a more detailed description of the method of using the tube or cable slitting tool shown in FIGS. 20-24, the method includes ensuring the first and second tool frame members 20, 22 are in an open position and selecting a first and second tray 70, 71 for insertion into the first and second tool frame members 20, 22, the tray selection based on the diameter of the cable 300 and the thickness of the outer jacket of the cable 300 and securing the first and second tray to the first and second tool frame member depressions (FIG. 20). The method includes placing a tube or cable 300 having an outer jacket in the first and second ring cut surfaces of one of the first or second trays 70, 71 (FIG. 23) or in the first and second longitudinal cut surfaces of one of the first or second trays 70, 71 (FIG. 22B). The method includes moving the first and second tool frame members to the closed position (FIG. 22C for ring cut, FIG. 24 for longitudinal cut) whereby the blades extending inward from each of the trays pierces the outer jacket of the cable 300. The method includes rotating the cable 300 in the direction of one of arrows 500, 501 if the cable 300 is in the ring cut surfaces (FIG. 24) or moving the cable 300 in a longitudinal direction, arrows 700, 701, if the cable 300 is in the longitudinal cut surfaces (FIG. 22C) and continuing movement of the cable 300 until the desired cut is made. The method includes moving the first and second tool frame members to the open position and removing the slit tube or cable 300 from the tray (FIG. 19). FIG. 22C shows the cable 300 in the longitudinal slitting position with the pivot pin 11 not shown since the hinge portion of the slitting tool is offset.

The trays have inboard tapered ramps to help align the cable 300. The ramps aid in guiding the end user to align the cable 300 to the channel before the tool is closed. The trays also have outboard tapered locating tabs on the outboard sides to precisely align the cutting channels as the tool chassis is closed onto the cable 300. The tool does not have to rely on the chassis for the channel precision.

The trays act as simple application specific spacers. The cutting blades and chassis do not change. The end user could conceivably have a kit of multiple trays and one tool chassis for a range of applications.

The trays are installed into the upper and lower housings and slide over the fixed blade through an opening. The trays are retained in the upper and lower housings. This design utilizes magnets to hold the trays in place and can easily be removed and swapped out for a different size.

Since each tray is sized for a specific cable size, the blade depth is controlled by the design of the tray. Each unique tray varies in thickness which creates variable chassis gap across the center plane. The interaction of the channel diameter and blade gap establishes the effective cutting depth into the cable 300. The relative blade protrusion for a given diameter can be controlled by varying the tray thickness for different applications. Each tray has a slightly different angle since the pivoting tool chassis opens and closes a different amount as the chassis gap varies. The tray provides the stop position and accurately sets the channel diameter; therefore, the end user can squeeze the tool shut and it will not add to the guide friction.

Figure 25:
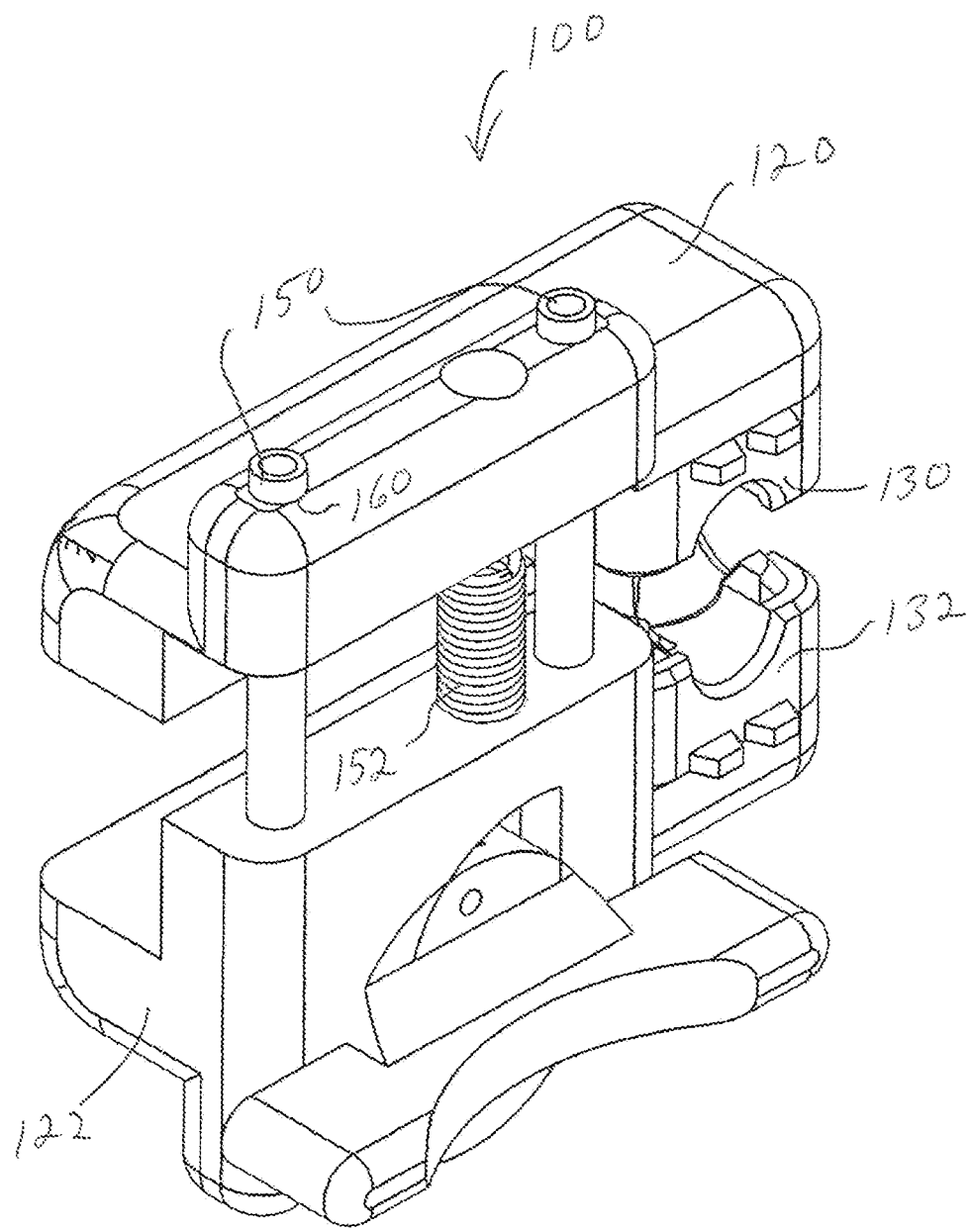
FIG. 25 shows a front right top perspective view of a second embodiment of the slitting tool according to the present invention.
Figure 26:
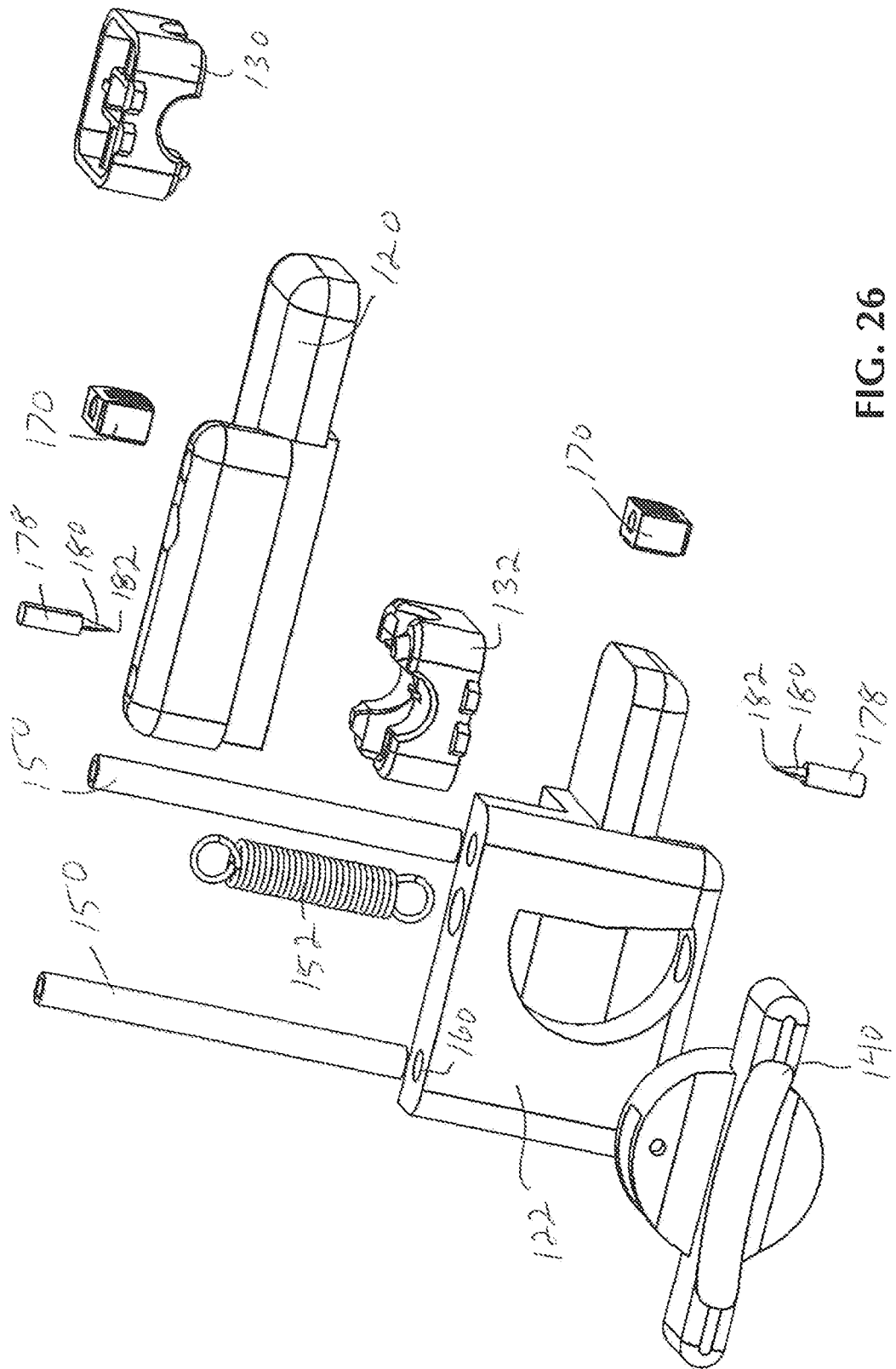
FIG. 26 show an exploded perspective view of the slitting tool showing FIG. 25.
Figure 29:
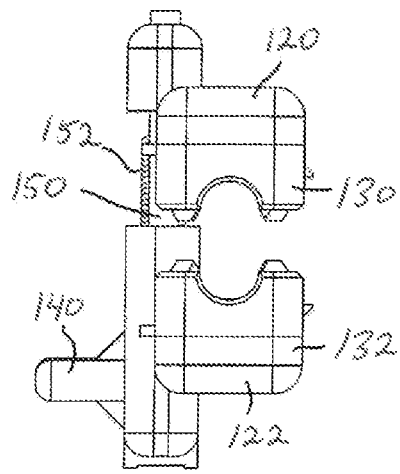
FIG. 29 shows a rear elevational view of the slitting tool shown in FIG. 25.
Figure 30:
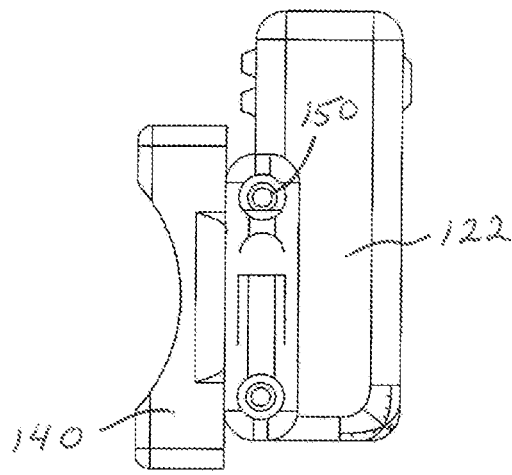
FIG. 30 shows a bottom plan view of the slitting tool shown in FIG. 25.
Figure 31:
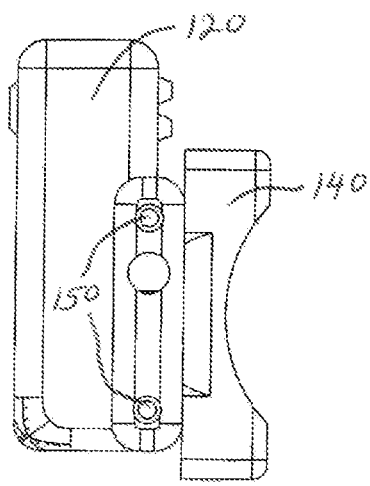
FIG. 31 shows a top plan view of the slitting tool shown in FIG. 25.
Figure 32:
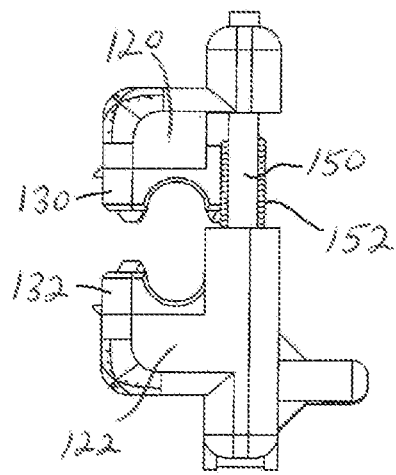
FIG. 32 shows a front elevational view of the slitting tool shown in FIG. 25.
Figure 33:
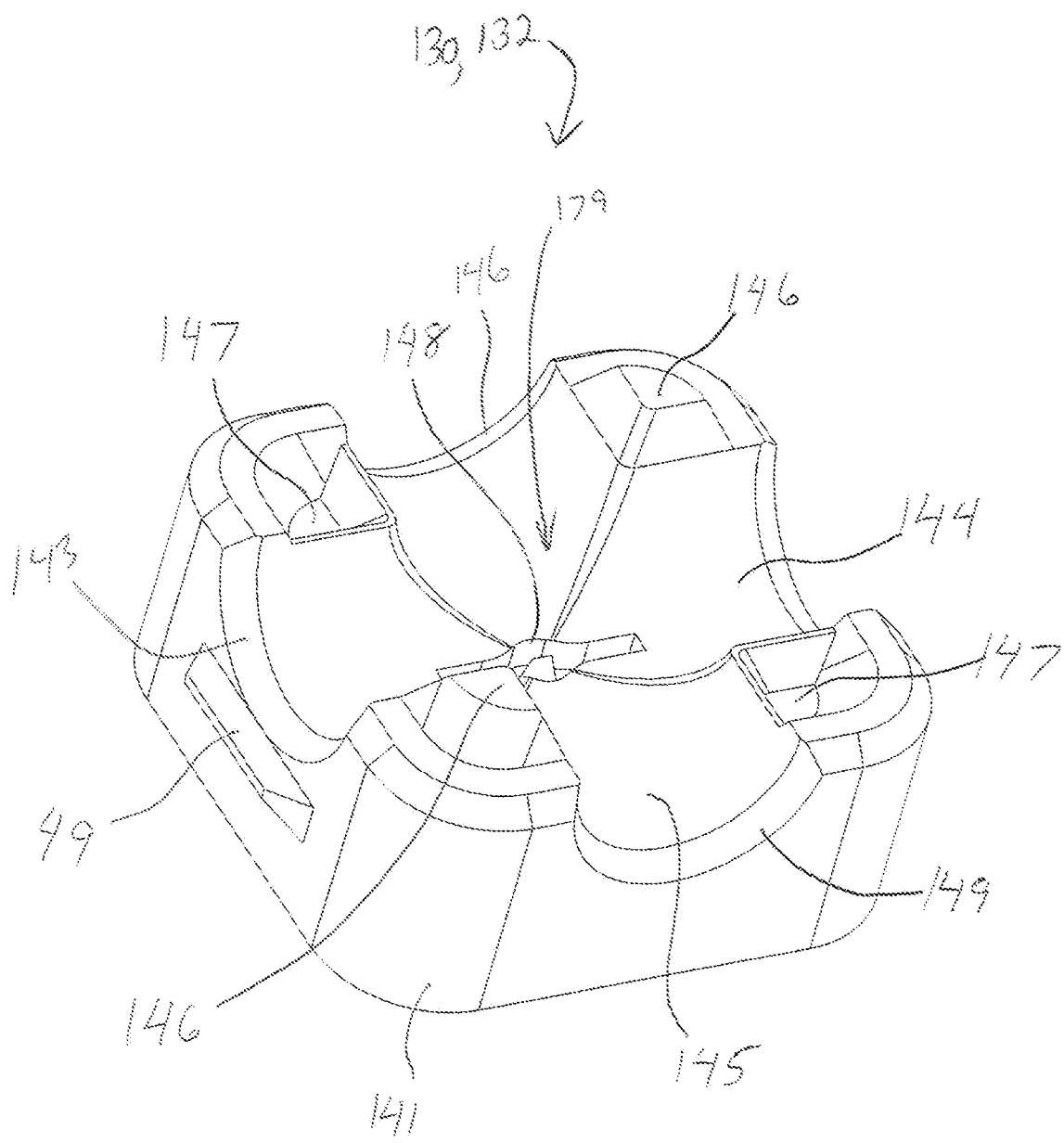
FIG. 33 shows a perspective view of a tray for the second embodiment of the slitting tool shown in FIG. 25.
Figure 34:
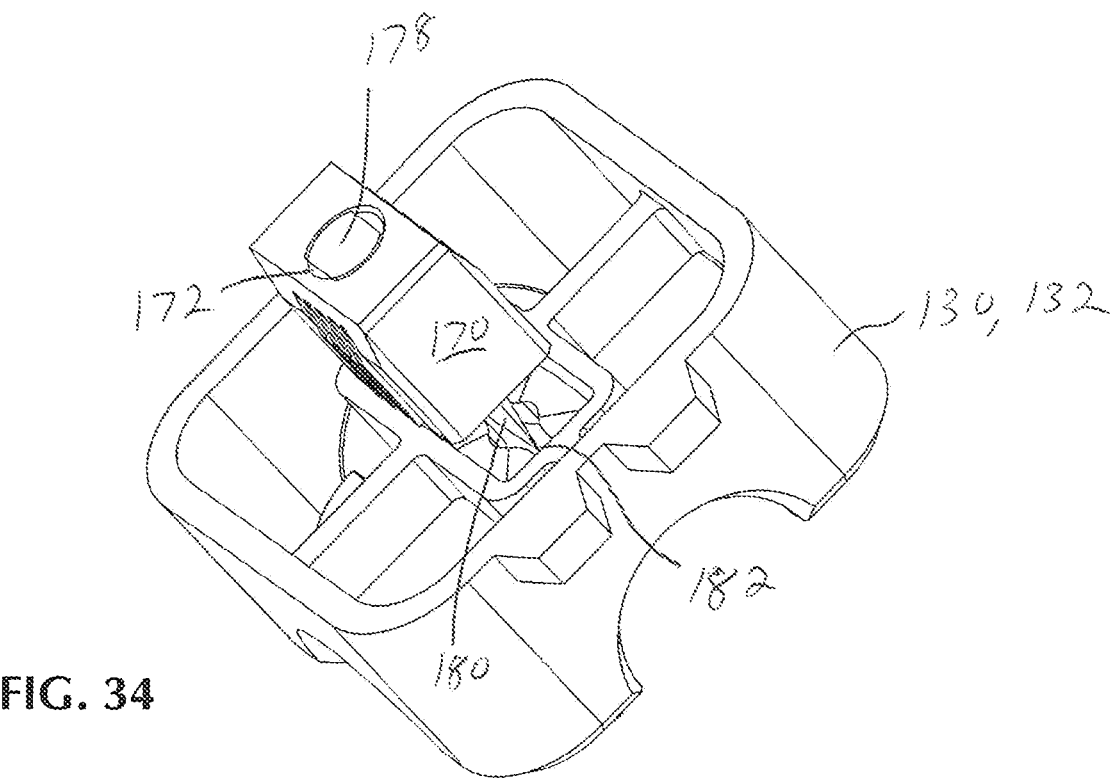
FIG. 34 shows a bottom perspective view of a tray, blade and blade holder for the second embodiment of the slitting tool shown in FIG. 25.
Figure 35:
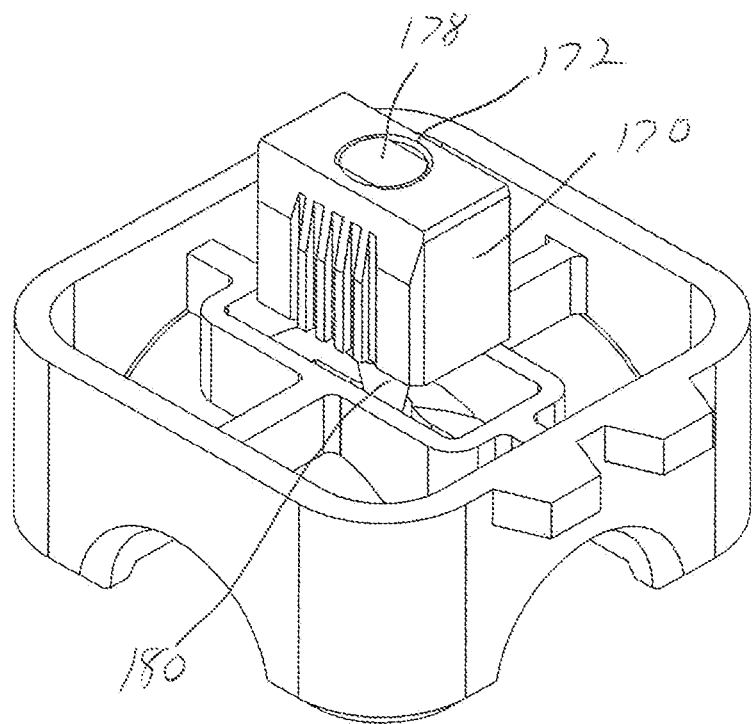
FIG. 35 shows a second bottom perspective view of a tray, blade and blade holder for the second embodiment of the slitting tool shown in FIG. 25.
Figure 36:
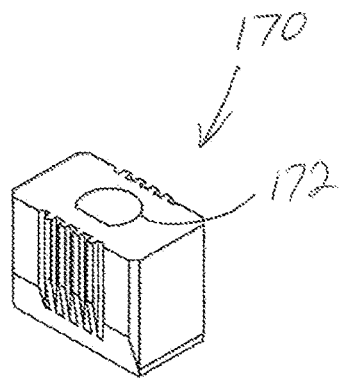
FIG. 36 shows the blade holder for the second embodiment of the slitting tool shown in FIG. 25.
Figure 37:
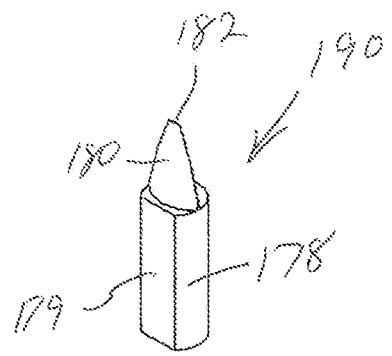
FIG. 37 shows the blade for the second embodiment of the slitting tool shown in FIG. 25.
Figure 38:
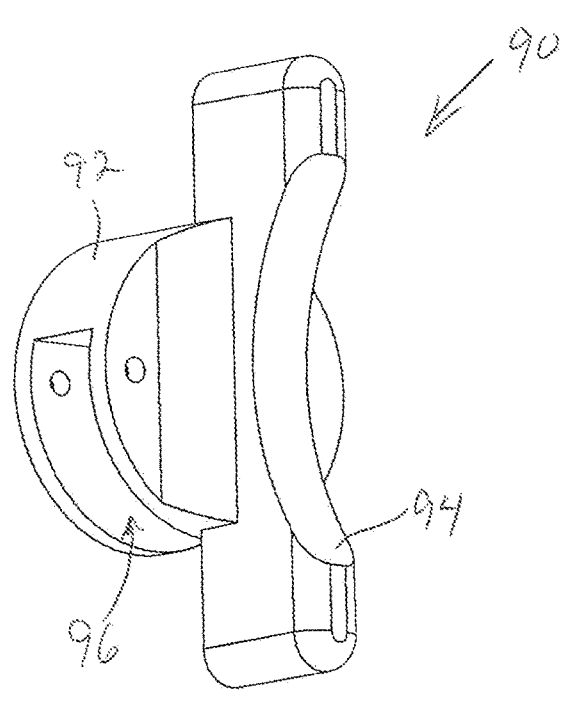
FIG. 38 shows a perspective view of the primary knob for the second embodiment of the slitting tool shown in FIG. 25.
Figure 39:
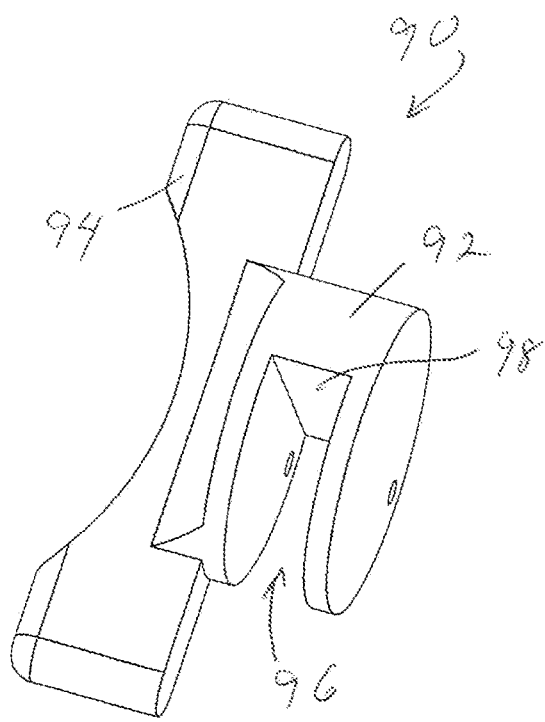
FIG. 39 shows a second perspective view of the primary knob for the second embodiment of the slitting tool shown in FIG. 25.

FIGS. 25-39 show a second embodiment of the present invention in which the tool trays move in a linear direction with respect to one another. The slitting tool 100 shown in FIG. 25 is also shown in an exploded view 26 and elevational views in FIGS. 27-32. The slitting tool 100 includes a pair of removable and interchangeable trays 130, 132 for slitting cables having various diameters and various sheathing or jacket thicknesses. The slitting tool 100 includes first and second opposing tool frame members 120, 122, each tool frame member including a depression 160, 162 along a first end 166, 168 of each tool frame member for insertion of the trays 180, 182. The tool 100 includes a pair of opposing blades 180 secured to the respective tool frame member 120, 122 and a blade support 170 for retaining the blades 120, 122 on the respective tool frame member 120, 122. The tool 100 includes a pair of parallel rods 50 extending from the second tool frame member 122 toward the first frame member 120 and a pair of parallel openings 160 extending through the second frame member 122 wherein the parallel rods 150 extend through the parallel openings 160 allowing the first frame member 120 to slide toward and away from the second frame member 122 with the first and second tray 130, 132 maintaining the same orientation with respect to one another. The chassis includes a compression spring 152 for biasing the tool in an open position.

The slitting tool 100 includes a first and second tray 130, 132 (FIGS. 33-35) securable in the depression 165, 167 of the first and second tool frame member 120, 122, respectively. Each of the first and second trays 130, 132 includes a tray base 141 having a tray cavity 179. The tray 130, 132 includes first and second concave ring cut surfaces 145, 146 spaced from one another across the tray cavity 179 for guiding the cable 300 when slitting in a circular direction around the diameter of the cable 300. The tray includes first and second longitudinal cut surfaces 143, 144 spaced from one another in a direction perpendicular the ring cut surface spacing for guiding the cable 300 when slitting along the length of the cable 300. The tray 130, 132 includes a blade opening 148 for allowing the blade to extend from the tray base bottom, through the tray base and into the tray cavity 79. The tray 130, 132 includes at least one protrusion 146 engagable with at least one alignment recess 147.

The slitting tool includes a primary knob 90 rotatably secured to the second frame member 122 for moving the first frame member 120 toward and away from the second frame member 122. The primary knob includes an internal flat surface 98 which engages the first frame member 120 for moving toward and away from the second frame member 122. A tension spring 152 biases the tool in the closed position.

The cable slitting tool has been shown above to perform repeatable and precise ring and longitudinal cuts in the outer sheath of a cable or duct without blade adjustment. The tool includes removable and interchangeable upper/lower trays provide application specific blade depth and channel sizing for performing repeatable and precise ring and longitudinal cuts. The chassis has offset support to allow for midspan and end strip cutting of the cable. Each housing is loaded with a precision blade with a fixed height and orientation (no adjustment or blade rotation). The blades are removable for replacement if they wear out. The tool includes removable trays with integrated taper guides and pockets to provide accurate centering of the groove channel and accurate position of the cable. The chassis assembly remains unchanged to work across the range of varying cable diameter and jacket thickness applications accomplished by changing out trays. The tool includes an ergonomic housing to assist with remaining fully closed during cutting though minimal hand pressure applied by the end user.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A cable sheath slitting tool comprising:
 first and second opposing tool frame members wherein at least a portion of the tool frame members are movable toward and away from one another;
 a pair of opposing blades securable on the respective tool frame member, the blades having a blade tip with a fixed, non-adjustable height and extending toward each other, wherein the blades are fixed to the tool frame members so as to be movable toward and away from each other upon movement of the tool frame members; and a first and second tray securable on the first and second tool frame member, respectively, each of the first and second trays including a tray cavity wherein a cable may be secured in the cavity with the blade positioned to slit the cable when the tool is in a closed position with the tool frame member portions toward one another, wherein the first and second trays define a first depth of cut of the blades.

2. The tool of claim 1 including a pivot pin wherein one end of each frame member is rotatable about the pivot pin and the opposite end of each frame member is movable toward and away from the opposite frame member.

3. The tool of claim 2 wherein an inner surface of each frame member is positioned at an angle from one another when the tool is in the closed position and wherein first and second tray include a bottom surface positioned against the tool frame member depression and a top surface at an angle to the bottom surface for allowing the first and second tray top surfaces to meet parallel to one another when the tool is in the closed position.

4. The tool of claim 1 wherein the first and second trays are removable and replaceable with third and fourth trays having different sized ring cut and longitudinal cut concave surface diameters than the first and second trays, the first and second trays for a first cable having a first diameter and the third and fourth trays for a second cable having a second diameter different from the first diameter.

5. The tool of claim 1 wherein the first and second trays are removable and replaceable with third and fourth trays having a different tray height than the first and second trays, the first and second trays for a first cable having a first sheath thickness and the third and fourth trays for a second cable having a second sheath thickness different from the first diameter.

6. The tool of claim 5 wherein a first angle between a top surface of the first and second tray relative to a bottom surface of the first and second tray is different from a second angle between a top surface of the third and fourth tray relative to a bottom surface of the second and third tray.

7. The tool of claim 5 including a rotatable latch knob for locking the tool in the closed position wherein the latch knob is variably adjustable for securing the tool in a closed position regardless of the tray depth.

8. The tool of claim 1 including first and second concave ring cut surfaces spaced from one another across the tray cavity for guiding the cable when slitting in a circular direction around the diameter of the cable and first and second longitudinal cut surfaces spaced from one another in a direction perpendicular to the ring cut surface spacing for guiding the cable when slitting along the length of the cable.

9. The tool of claim 1 including a first and second magnet secured to the first and second frame members respectively and a first and second metal element secured to the first and second tray respectively wherein the first magnet removably secures the first tray to the first frame member and the second magnet removably secures the second tray to the second tray member.

10. The tool of claim 1 including a first and second magnet secured to the first and tray respectively and a first and second metal element secured to the first and second frame member respectively wherein the first magnet removably secures the first tray to the first frame member and the second magnet removably secures the second tray to the second tray member.

11. The tool of claim 1 including a first and second tool chassis end wherein the first and second trays are securable to the first end of the tool chassis and the second end of the tool chassis is offset from a tool centerline axis so that the cable, when inserted in the tool for a longitudinal cut may extend through the entire tool without obstruction.

12. The tool of claim 1 including a rotatable latch knob for locking the tool in the closed position.

13. The tool of claim 12 wherein the latch knob is for securing the tool in the closed position for storage.

14. The tool of claim 12 wherein the latch knob is rotatably secured to the first or second tool frame member on an end portion of the tool opposite the tool end securing the first and second trays, the latch knob having a circular edge including a flat surface on the circular edge, the flat surface engagable with a portion of the other of the first or second tool frame member.

15. The tool of claim 1 wherein the blades are removably secured to the first and second frame members.

16. A cable sheath slitting tool comprising:
first and second opposing tool frame members wherein at least a portion of the tool frame members are movable toward and away from one another;
a pair of opposing blades securable on the respective tool frame member, the blades having a blade tip extending toward each other and are movable toward and away from each other;
a first and second tray each including a tray cavity; and
a first and a second magnetic connection configured to magnetically secure the first and second tray on the first and second tool frame member, respectively, such that a cable may be secured in the cavity with the blade positioned to slit the cable when the tool is in a closed position with the tool frame member portions toward one another and the first and second trays defining a first depth of cut of the blades, wherein the blade tip of each of the blades has a fixed, non-adjustable height with respect to the respective tool frame member.

17. The tool of claim 16, wherein the first magnetic connection comprises a first magnet and a first metal element which secure the first tray to the first frame member and the second magnetic connection comprises a second magnet and a second metal element which secure the second tray to the second frame member.

18. The tool of claim 17, wherein the first magnet is secured to one of the first frame member and the first tray and the first metal element is secured to the other of the first frame member and the first tray.

19. The tool of claim 17, wherein the second magnet is secured to one of the second frame member and the second tray and the second metal element is secured to the other of the second frame member and the second tray.

* * * * *